(No Model.)
R. E. BRISTOW.
LEMON JUICE EXTRACTOR.
No. 377,140. Patented Jan. 31, 1888.
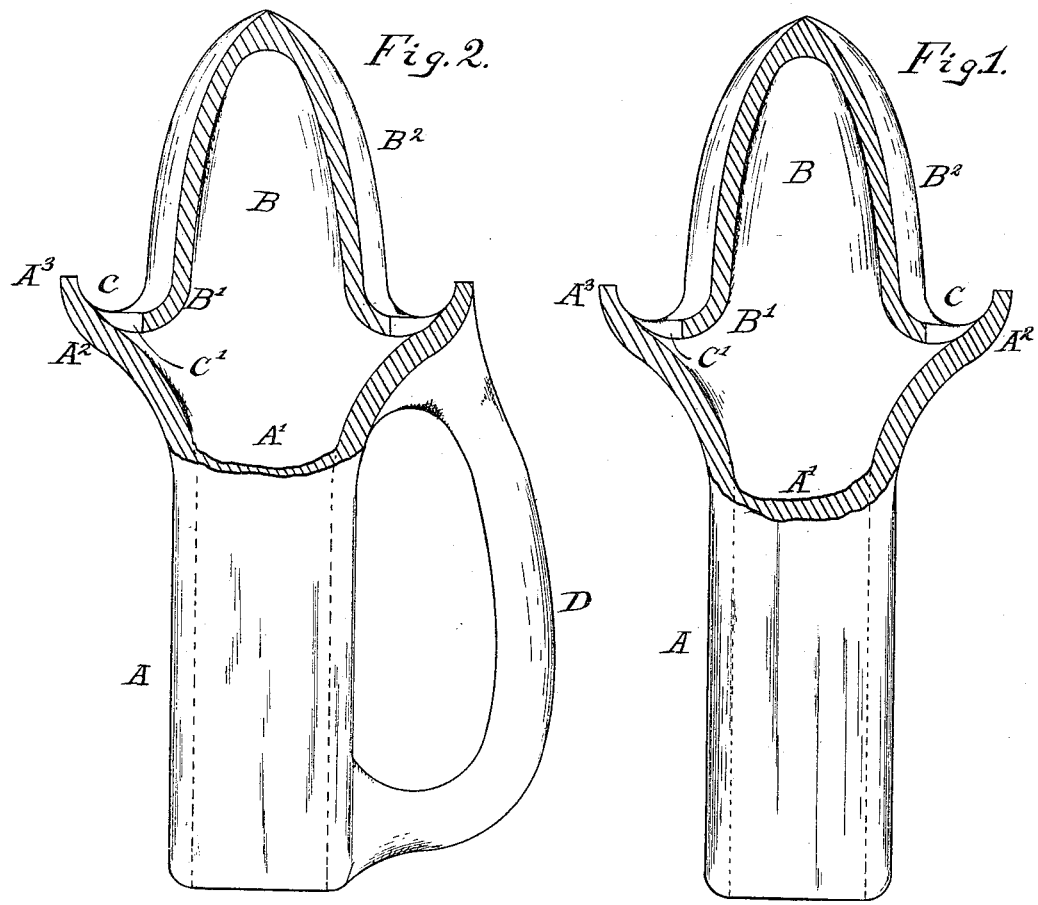
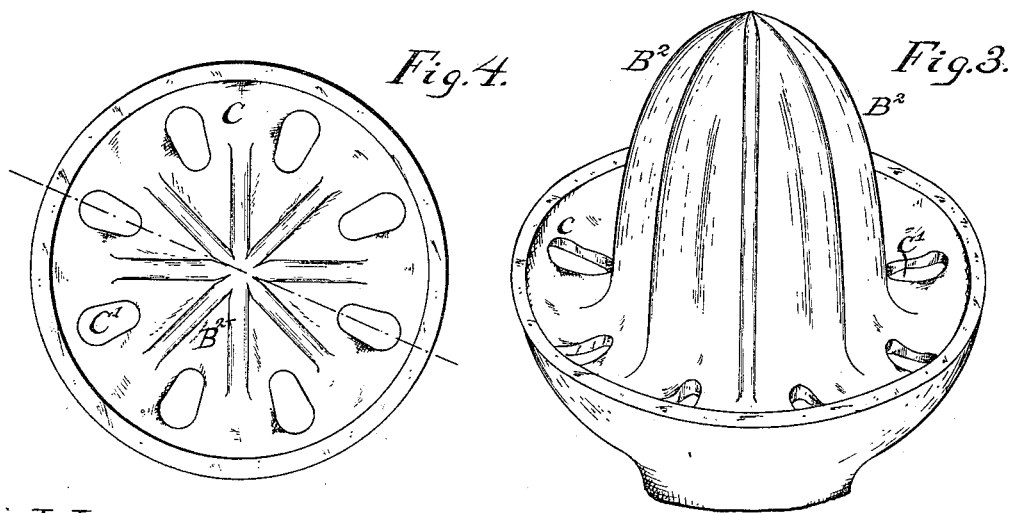
Witnesses:
G. A. Winans.
C. M. Sames.
Inventor:
Ralph E. Bristow
L. L. Morrison
Atty.

United States Patent Office.

RALPH E. BRISTOW, OF ROCKFORD, ILLINOIS.

LEMON-JUICE EXTRACTOR.

SPECIFICATION forming part of Letters Patent No. 377,140, dated January 31, 1888.

Application filed September 22, 1887. Serial No. 250,378. (No model.)

*To all whom it may concern:*

Be it known that I, RALPH E. BRISTOW, a citizen of the United States, residing at Rockford, in the county of Winnebago and State of Illinois, have invented a certain new and useful Improvement in Lemon-Juice Extractors, of which the following is a specification.

The object of this invention is to provide a device of simple construction for extracting the juice from lemons without expressing the oil from the rinds of the same.

A further object of this invention is to so contrive and fashion said device that it will conduct the lemon-juice separated from the seeds and pulp of the lemons directly from the extractor into any desired receptacle.

This invention consists of certain new and useful constructions and combinations, which are hereinafter described, and pointed out in the claim.

Referring to the accompanying drawings, which form a part of this specification, Figure 1 is a view in elevation of my improved lemon-juice extractor, parts being broken away to show the interior construction thereof. Fig. 2 is a like view of the same provided with a handle. Figs. 3 and 4 are respectively isometric and plan views of the lemon-juice extractor represented in Fig. 1.

Like letters of reference indicate corresponding parts throughout the several figures.

A is a vessel, preferably cylindrical in form, having a passage, A', extending longitudinally therethrough and flaring to a bell shape, A², at the upper end thereof, to form a support for a part to be described hereinafter.

B is a conoidal shell, the rim B' whereof is flared sufficiently to adapt the same to engage with the inside of the bell-shaped portion A² of the vessel A a little below the edge A³ thereof. The conoidal shell B is provided exteriorly with a series of ribs, B², extending from the base to the apex of the same.

C is an annular groove formed by the curved portions of the rims A³ and B' of the parts A and B, and C' apertures leading from the bottom of the groove C into the passage A' in the vessel A.

D represents a handle that may be attached to the vessel A, if so desired, or it may be dispensed with altogether, if preferred.

In order to use the lemon-juice extractor most successfully, having halved the lemons from which the juice is to be extracted, grasp the vessel A of the extractor in one hand, and with the other take a half-lemon and press the center of the cut surface thereof against the apex of the shell B, and rotate the same with the thumb and fingers until the juice is extracted therefrom. The juice, as fast as it is extracted, will flow through the apertures C' into the passage A' in the vessel A, leaving all seeds and fragments of pulp in the groove C, whence they may be readily removed by simply inverting the extractor.

The lower end of the vessel A of the extractor may be held over or introduced into any suitable receptacle for receiving the extracted lemon-juice while the operation of extracting the same is in progress.

This lemon-juice extractor can be most successfully and satisfactorily manufactured by casting it of glass.

I claim—

The herein-described lemon-juice extractor, consisting of a vessel, A, having a longitudinal passage, A', therethrough, and flaring to a bell shape at the upper end thereof, a conoidal shell, B, having a rim, B', flared sufficiently to adapt the same to engage with the inside of the bell-shaped portion A² of the vessel A, furnished with ribs B², extending from the base to the apex of said shell and provided with an annular groove, C, pierced by means of the perforations C', and the handle D, substantially as set forth.

RALPH E. BRISTOW.

Witnesses:
H. J. EATON,
L. L. MORRISON.